Feb. 10, 1942.        J. HEINKEL         2,272,912
                      GREASE TRAP
                   Filed Nov. 29, 1940
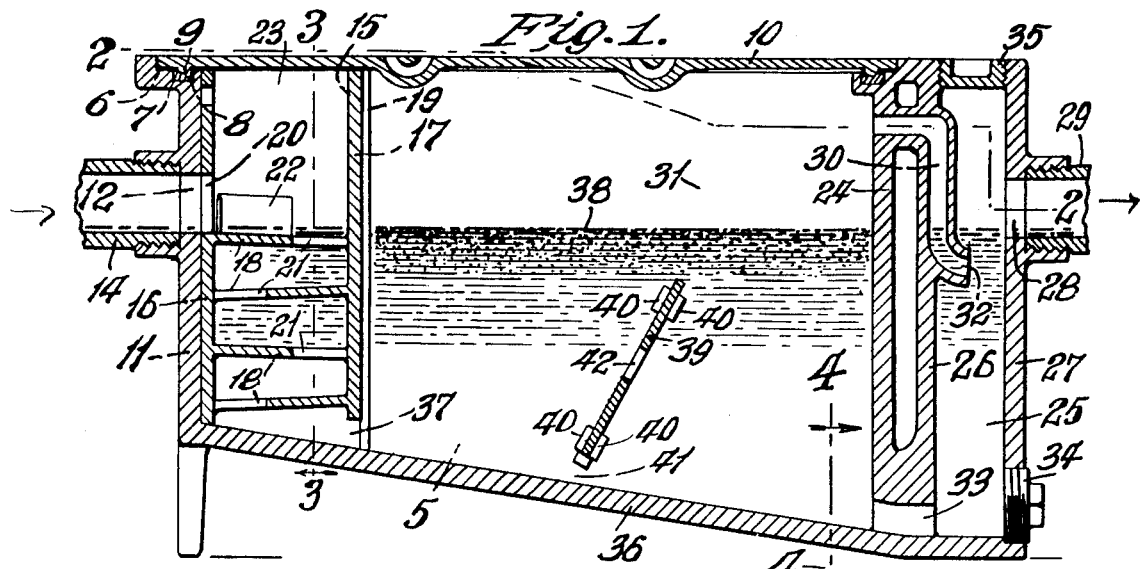
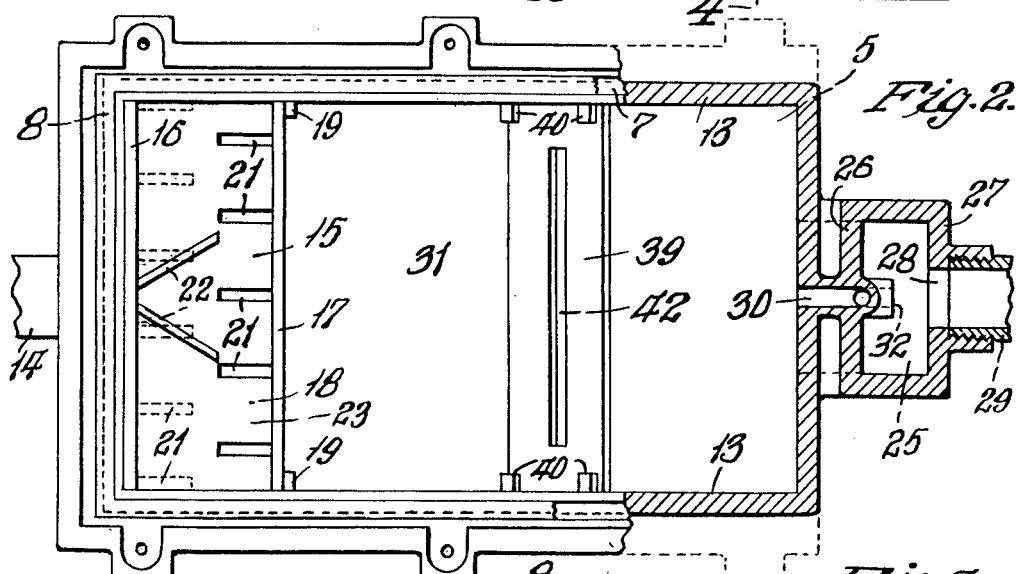
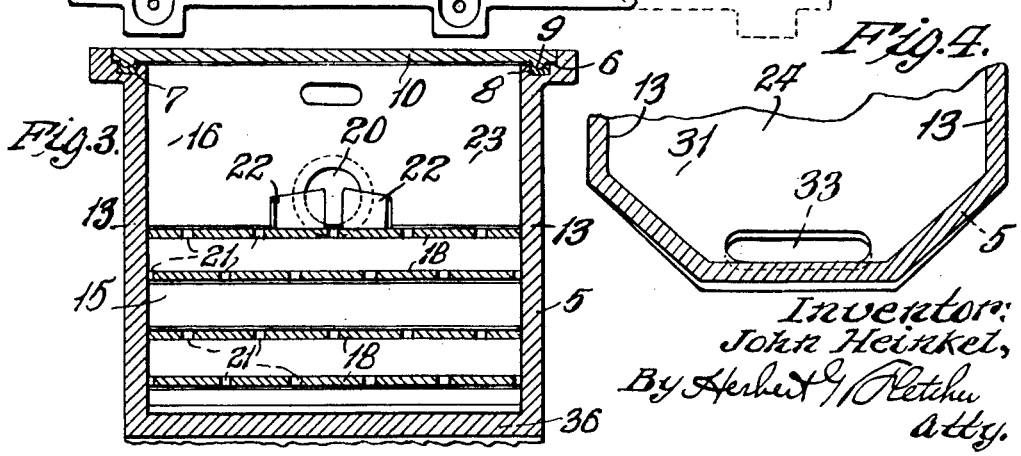
Inventor:
John Heinkel,
By Herbert G. Fletcher
atty.

Patented Feb. 10, 1942

2,272,912

UNITED STATES PATENT OFFICE 2,272,912

GREASE TRAP

John Heinkel, St. Louis, Mo., assignor to John C. Kupferle Foundry Company, St. Louis, Mo., a corporation of Missouri Application November 29, 1940, Serial No. 367,819

12 Claims. (Cl. 182—9)

This invention relates to certain new and useful improvements in a grease trap, and which improvements have for their purpose to provide a trap capable of collecting and retaining a maximum quantity of the fluent substances from the waste drain water of kitchen sinks, dish washing machines, etc.

In particular, it is an object of the invention to provide a simple and compact grease trap of a structure which is automatic and highly efficient in its operation.

Another object is to provide a grease trap having a receiving chamber for the waste drain water, a separating basin and an outlet chamber for receiving the separated water or liquid.

A further object is to increase the separating efficiency of the grease trap by providing an improved arrangement of baffles in the receiving chamber for directing and retarding the flow of draining waste water to the separating chamber.

A still further object is to provide the receiving chamber of the grease trap in the form of a removable baffle plate holder and whereby the baffle plates of the holder will serve to catch and retain garbage fragments which can readily be removed when the holder is lifted from the trap.

Another still further object of the invention is to provide the grease trap with improved venting means for preventing siphon draining of the liquid from the trap, the venting means also being disposed so as to provide a water seal against sewer gases entering the trap.

With the foregoing and other objects in view which will appear as the description proceeds, my invention resides in the combination and arrangement of parts and in the details of construction hereinafter described and claimed, it being understood that changes may be made within the scope of what is claimed without departing from the spirit of the invention.

An embodiment of the invention is illustrated in the accompanying drawing, wherein:

Figure 1 is a vertical longitudinal sectional elevation taken through this improved grease trap.

Figure 2 is a plan elevation partly in section and taken approximately on the line 2—2 of Fig. 1.

Figure 3 is a vertical transverse sectional elevation taken approximately on the line 3—3 of Fig. 1.

Figure 4 is a fragmentary vertical transverse sectional elevation taken approximately on the line 4—4 of Fig. 1.

Referring by numerals to the accompanying drawing, 5 designates a casing having a rectangular cover seat 6 on its upper end, and formed in said seat is an annular recess 7 having a compressible gasket 8 therein to be engaged by the annular bead 9 which is on the underside of the cover 10.

The end wall 11 of the casing 5 has an inlet opening 12 which is disposed centrally between the side walls 13 of the casing, and in communication with said opening is a waste drain pipe 14 and in abutment with the inner face of the end wall 11, is a removable baffle plate holder 15.

The baffle plate holder 15 comprises a pair of oppositely disposed walls 16 and 17 which are joined to each other by a series of horizontally inclining baffle plates 18, the wall 16 being held in abutment with the inner face of the wall 11 by a pair of vertical ribs 19 engaging the outer face of the wall 17, each rib 19 being integral with or secured to a respective side wall 13 of the casing, the ribs 19 and the inner surface of the wall 11 also serving as guideways for vertically lifting the baffle plate holder 15 from the casing and for lowering the holder in the casing.

The wall 16 of the baffle plate holder 15 is provided with an opening 20 for alinement with the inlet opening 12 of the end wall 11, and the uppermost baffle plate 18 of the series of baffle plates, while being in approximate alinement with the bottom of the inlet opening 20 of the wall 16 of the holder 15, is inclined downwardly therefrom to the wall 17 and is provided with a plurality of drain openings 21 which are elongated in the direction of the inclination given to the baffle plate, and extend from the approximate center of the plate to the wall 17, and extending upwardly from said plate are a pair of distributing vanes 22 which diverge outwardly from the inlet opening 20 of the wall 16 of the baffle plate holder 15.

The next baffle plate 18 below the uppermost baffle plate, is inclined downwardly in an opposite direction and is also provided with a plurality of elongated openings 21 and the succeeding baffle plates are in turn alternately inclined with their respective elongated openings disposed on the lower halves of their inclined surfaces so that entrained waste drain water from the pipe 14 will traverse a zig-zag course downwardly through the plate holder, which on account of its spaced opposing walls 16 and 17 provides an inlet chamber 23 in the casing 5.

Outwardly disposed from the end wall 24 of the casing 5 is a separated liquid chamber 25 having opposing walls 26 and 27, and formed in the wall 27 is an outlet opening 28 having a drain pipe 29 connected therewith which may be led to a sewer pipe, the outlet opening 28 being in horizontal alinement with the inlet opening 12 in the wall 11 of the casing. Formed in the wall 26 of the chamber 25 is a vertically extending passageway 30 which leads from the upper end of the separating chamber 31 which is disposed within the casing 5 and extends from the baffle plate holder 15 to the end wall 24 of the casing, the lower end 32 of the passageway 30 communicating with the chamber 25 on a plane beneath the outlet opening 28 of said chamber 25.

A horizontally elongated opening 33 is formed at the bottom of the end wall 24 of the casing and the wall 26 of the chamber 25 for providing means of communication from the separating chamber 31 to the chamber 25, and opposite to said opening 33 within the wall 27 is a clean-out plug 34 and at the upper end of the chamber 25 another clean-out plug 35 is provided.

The bottom wall 36 of the casing 5 is inclined downwardly from the end wall 11 to the opening 33 which communicates with the chamber 25 and as the lower end of the wall 17 of the baffle plate holder 15 terminates a distance above the inclined bottom wall 36, a passage 37 is formed therebeneath, said passage leading from the inlet chamber 23 to the separating chamber 31.

The afore defined description of the disclosures shown in the several figures of the drawing, comprises this improved grease trap which is coupled in the waste or drain line of a kitchen sink or the like, in a manner whereby the top of the cover 10 may be disposed at the floor level of a kitchen for the convenience of being able to remove the cover for accessibility to the trap and particularly the inlet chamber 23 and the separating basin or chamber 31.

During normal operation of the grease trap and as best shown in Fig. 1, the waste liquid from a kitchen sink ordinarily comprises a mixture of grease and water and which upon entering the trap, is maintained at the approximate level indicated at 38.

The waste liquid upon entering the inlet chamber 23 through the drain pipe 14 is immediately distributed, directed and spread over the elongated upper baffle plate 18 by the vanes 22 thereof, said vanes simultaneously reducing the velocity of the liquid flow before the liquid falls on to the next lower disposed baffle plate 18 through the elongated openings 21 of the upper baffle plate. As the liquid is descended in its zig-zag flow on to successive baffle plates 18, by the time it reaches the bottom of the inlet chamber 23, its velocity has been so lowered that it enters the basin 31 through the passage 27 without practically any turbulence.

As the waste drain liquid from the sink is ordinarily warm, upon its entry into the lower end of the basin 31 through the passage 37, it encounters and mingles with the cooler standing liquid in the basin, and upon becoming chilled, the grease or fluent substances separate from the waste drained liquid and gradually gravitate upwardly to the top of the cooler liquid body in the basin and accumulate in the upper portion of the basin.

This separation of the lighter grease particles from the waste drained liquid, obviously leaves clearer liquid adjacent the bottom of the basin and particularly adjacent the end wall 24 of the casing or basin and from where it will flow through the opening 33 and ascend the chamber 25 from where it will be discharged in a purified state, through the outlet 28 and into the drain pipe 29 which may be connected with the sewer.

At times however, when a maximum supply of waste drain liquid is delivered to the trap, a reduced velocity of liquid flow may continue as the liquid enters the basin 31 through the passage 37; therefore, in order to check somewhat the consequent turbulence on the liquid in the basin, an upwardly extending baffle board 39 which is inclined towards the end wall 24 is provided, said baffle board being supported between pairs of lugs 40 which are extended from opposite side walls 13 of the casing 5, said baffle board being elevated above the bottom wall 36 of the casing to provide a horizontally elongated passage 41 and having an intermediately disposed elongated passage 42.

When a maximum supply of waste drain liquid is entraining to and through the grease trap, the baffle board 39 will tend to slacken and retard the turbulence on the waste liquid entering the basin 31 by reason of the liquid flow engaging the baffle board and being directed upwardly, thus agitating and separating the fat or grease particles whereby opportunity and time will be given these lighter particles to ascend and adhere to the accumulated fatty body floating on top of the liquid in the basin. Also, the baffle board 39 will tend to prevent direct flow of waste liquid from the passage 37 through the basin and to the outlet 33 and to the chamber 25.

During separating of the lighter grease particles of the waste liquid in the basin 31, the heavier substances will gravitate to the lower end of the basin, and the bottom wall 36 of the casing inclining downwardly from the inlet chamber 23 to the outlet opening 33 in the end wall 24 will assist the flow of the heavier substances.

In order to maintain the approximate liquid level 38 in the trap for efficient operation, the vent passageway 30 is provided with its lower end 32 on a plane beneath the outlet opening 28 and the indicated liquid level 38, and as the upper end of the passageway 30 communicates with the chamber 31 above the liquid level 38, said passageway also provides a liquid or water seal against sewer gases being backed upwardly into the chamber 31.

Further, by reason of the passageway communicating with the chamber 31 in the event of attempted siphoning of the liquid through the trap by reason of the trap being worked to a maximum capacity, the liquid level when lowered on a plane with the inlet end 32 of the passageway, will permit air being vented from the upper end of the chamber 31 to the chamber 25 wherein the siphonage action will be broken as well as an amount of foul air being vented from the chamber 31.

Periodically, the cover 10 of the trap is removed for providing access for removal of the accumulated floating fatty substances, and the baffle plate holder 15 may be removed to free it of garbage portions trapped by the baffle plates 18 by reason of being too large for passage through the elongated drain openings 21 in the baffle plates.

With further regard to the baffle board 39 directing the liquid flow upwardly in slackening and retarding the flow turbulence, the intermediate passage 42 of the baffle board will be entered by some of the flow, thus dividing and thereby further weakening the velocity of the upwardly directed flow and minimizing swirling thereof, in the separating basin 31.

Having thus described the invention so that those skilled in the art will be able to practice the same, what I desire to secure by Letters Patent is defined in what is claimed, it being understood that various changes in the device shown and described in detail and not amounting to invention, may be made without departing from the spirit and scope of my invention.

What I claim is:

1. A grease trap comprising a casing having an inlet chamber at one end, an outlet chamber at its opposite end, a separating basin disposed between said chambers, and a series of apertured horizontally inclining baffle plates disposed in staggered relation and located in said inlet chamber.

2. A grease trap comprising a casing having an inlet chamber at one end, an outlet chamber at its opposite end, and a separating basin disposed between said chambers, said inlet chamber being formed by a baffle plate holder having opposing walls from which the baffle plates are extended.

3. A grease trap comprising a casing having an inlet chamber at one end, an outlet chamber at its opposite end, and a separating basin disposed between said chambers, said inlet chamber being formed by a baffle plate holder comprising opposing walls having apertured plates joined therewith.

4. A grease trap comprising a casing having an inlet chamber at one end, an outlet chamber at its opposite end, and a separating basin disposed between said chambers, said inlet chamber being formed by a removably mounted baffle plate holder having apertured plates and comprising opposing walls with which the baffle plates are joined.

5. A grease trap comprising a casing having an inlet chamber at one end, an outlet chamber at its opposite end, and a separating basin disposed between said chambers, said inlet chamber being formed by a baffle plate holder which comprises a pair of opposing walls and having a series of horizontally inclining apertured plates disposed in zig-zag formation.

6. A grease trap comprising a casing having an inlet chamber at one end, an outlet chamber at its opposite end, a separating basin disposed between said chambers, communicating means between said chambers at the lower ends thereof, and a series of horizontally inclining apertured baffle plates vertically disposed in said inlet chamber, said casing having its bottom wall inclined downwardly from said inlet chamber to said outlet chamber and beneath said basin.

7. A grease trap comprising a casing having a downwardly inclining bottom wall and an insertable baffle plate holder at one end forming an inlet chamber to the casing, an outlet chamber at the opposite end of the casing, and a separating basin disposed between said chambers, said holder having opposing walls and one of which engages the bottom wall of the casing and the other wall being disposed above the bottom wall to provide an inlet passage to the basin.

8. A grease trap comprising a casing having an inlet chamber at one end, an outlet chamber at its opposite end, and a separating basin disposed between said chambers, said inlet chamber being formed by a removable baffle plate holder having a series of horizontally inclining apertured plates vertically disposed in zig-zag formation.

9. A grease trap comprising a casing having an inlet chamber at one end, an outlet chamber at its opposite end, a separating basin disposed between said chambers and having a vertically extending baffle board, and a series of horizontally inclining baffle plates vertically disposed in said inlet chamber.

10. A grease trap comprising a casing having an inlet chamber at one end, an outlet chamber at its opposite end, a separating basin disposed between said chambers and having a vertically extending baffle board disposed above the bottom wall of the casing to form a passageway therebeneath, and a series of horizontally inclining baffle plates vertically disposed in said inlet chamber.

11. A grease trap comprising a casing having an inlet chamber at one end, an outlet chamber at its opposite end and having a discharge opening, a separating basin disposed between said chambers, communicating means between said chambers at the lower ends thereof, and a vertically extending passageway leading from the upper end of said basin to said outlet chamber on a plane beneath and adjacent the discharge opening thereof.

12. A grease trap comprising a casing having an inlet chamber at one end, an oulet chamber at its opposite end and having a discharge opening, a separating basin disposed between said chambers, communicating means between said chambers at the lower ends thereof, and a vertically extending passageway leading from the upper end of said basin to said outlet chamber on a plane beneath and adjacent the discharge opening of said chamber.

JOHN HEINKEL.